(12) United States Patent
Ishikawa (10) Patent No.: US 7,258,149 B2
(45) Date of Patent: Aug. 21, 2007

(54) TIRE FOR MOTORCYCLE

(75) Inventor: Takeshi Ishikawa, Kobe (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 0 days.

(21) Appl. No.: 11/224,048

(22) Filed: Sep. 13, 2005

(65) Prior Publication Data

US 2006/0000535 A1    Jan. 5, 2006

(51) Int. Cl.
*B60C 9/26* (2006.01)
*B60C 9/22* (2006.01)
*B60C 9/18* (2006.01)

(52) U.S. Cl. .............. 152/528; 152/531; 152/532; 152/533

(58) Field of Classification Search .......... 152/528, 152/529, 531–533
See application file for complete search history.

(56) References Cited

U.S. PATENT DOCUMENTS 1,842,353 A * 1/1932 Lorentz ............ 152/532 X
5,441,093 A   8/1995 Shirasyouji et al.

FOREIGN PATENT DOCUMENTS

| EP | 0 280 674 A2 | * | 8/1988 | ............ 152/532 |
| JP | 61257305 A | * | 11/1986 | ............ 152/528 |
| JP | 04365602 A | * | 12/1992 | |
| JP | 04365603 A | * | 12/1992 | |
| JP | 05-246210 A | | 9/1993 | |
| JP | 10-181310 A | | 7/1998 | |

* cited by examiner

*Primary Examiner*—Adrienne C. Johnstone
(74) *Attorney, Agent, or Firm*—Birch, Stewart, Kolasch & Birch, LLP (57) ABSTRACT

A tire containing a carcass ply formed along a tread portion, a shoulder portion and a sidewall portion. The carcass ply is reinforced by a belt ply and a band ply and the belt ply includes a fold-back portion. A buffer layer is formed between the belt ply and the band ply. A dimension (SW) of the inner end of the fold-back portion is set to be 20% to 40% of a tread width (TW). A width (JW) of the band ply is set to be 20% to 65% of the tread width (TW). A dimension of the overlap of the fold-back portion and the band ply is set to be equal to or smaller than 15 mm.

3 Claims, 3 Drawing Sheets

TIRE FOR MOTORCYCLE

BACKGROUND OF THE INVENTION

1. Field of the Invention

The present invention relates to a structure of a tire for a motorcycle.

2. Description of the Related Art

In recent years, a motorcycle can carry out high speed running with an increase in the displacement of an engine, and the size and weight have been increased. For this reason, an enhancement in performance has increasingly been required for motorcycle tires. The body of the motorcycle is greatly tilted during cornering. Therefore, it is necessary to design a tire which generates a proper cornering force and camber thrust when it rolls at a tilt with respect to a road surface.

In the case in which only the cornering of the motorcycle is taken into consideration, a high stiffness is maintained in the shoulder portion of the tire so that stable high speed cornering can be implemented. In the tire for the motorcycle, however, the stiffness of the center portion of a tread is generally increased with an enhancement in the stiffness of the shoulder portion. However, by providing the tire with a center portion having a high stiffness, the straight running stability of the motorcycle is hindered.

Conventionally, the high stiffness of the shoulder portion in the tire for a motorcycle has been maintained, and at the same time, the stiffness of the center portion has been required to be reduced more greatly than that of the shoulder portion. In order to meet the demand, various proposals have been made in Japanese Laid-Open Patent Publication No. 10-181310, Japanese Laid-Open Patent Publication No. 5-246210 and U.S. Pat. No. 5,441,093.

In a conventional tire for a motorcycle which has been provided in order to cause the straight running stability and high speed cornering property to be compatible with each other, an enhancement in the stiffness of the shoulder portion and the suppression of the stiffness of the center portion are not always well-balanced, and thus the straight running stability and the high speed cornering property are not compatible with each other on a high level. The structural continuity of a tread portion and the center portion is not always achieved. For this reason, in a running state for a transition period from straight running to cornering and a transition period from the cornering to the straight running, linearity is maintained with difficulty.

It is an object of the present invention to provide a tire for a motorcycle in which straight running stability and high speed cornering y in a motorcycle can be caused to be compatible with each other at a high level, and furthermore, excellent linearity can be implemented in the transition from straight running to cornering or from cornering to straight running.

SUMMARY OF THE INVENTION

A tire for a motorcycle according to the present invention comprises a carcass ply, a belt ply and a band ply. The carcass ply is formed in a winding state from inside toward the outside in an axial direction of the tire around a pair of bead cores opposed to each other in the axial direction of the tire and along the tread. The belt ply and the band ply are formed along the tread and are laminated, in order, on the outside of the carcass ply in the radial direction of the tire. The carcass ply has a carcass cord constituted by an organic fiber provided to cross the equator plane of the tire at an angle of 65 to 90 degrees, as an absolute value. The belt ply has a belt cord to cross the equator plane of the tire at an angle of 10 to 60 degrees as an absolute value. Both side portions of the belt ply in the axial direction of the tire are folded back outward in the radial direction of the tire to form a pair of fold-back portions. The band ply has a band cord wound spirally to cross the equator plane of the tire at an angle of 10 degrees or less as an absolute value. The dimension of the inner end of each of the fold-back portions is set to be 20% to 40% of the tread width. A width of the band ply is set to be 20% to 65% of the tread width. The dimension of overlap of each of the fold-back portions and the band ply is set to be equal to or smaller than 15 mm.

In the tire, the carcass ply is formed along the tread, and furthermore, both side portions of the carcass ply are wound around the bead core and are wound up from an inside toward outside in the axial direction of the tire. Consequently, the stiffness of the sidewall portion of the tire for a motorcycle can be enhanced. The belt ply is formed on the outside in the radial direction of the tire with respect to the carcass ply, and the band ply is further formed on the outside in the radial direction of the tire. By the belt ply and the band ply, the carcass ply is reinforced so that the stiffness of the whole tire for a motorcycle can be enhanced.

The belt ply is formed along the tread portion. Therefore, the carcass ply is reinforced and the shoulder portion of the tire for a motorcycle is reinforced so that the stiffness of the shoulder portion can be enhanced. In addition, both side portions of the belt ply (that is, both side portions in the axial direction of the tire) are folded back outward in the axial direction of the tire. In particular, therefore, the stiffness of the shoulder portion can be enhanced effectively. Furthermore, the dimension of the inner end of the fold-back portion is set to be 20% to 40% of the tread width. Consequently, an increase in a weight can be suppressed, and at the same time, only the stiffness of the shoulder portion can be enhanced intensively. In the present invention, the "tread width" indicates a dimension in the axial direction of the tread portion which is measured along the geodetic line of the tread surface.

Moreover, the direction of the carcass cord is set to have an absolute value of 65 degrees to 90 degrees with respect to the equator plane of the tire, and furthermore, the direction of the belt cord is set to have an absolute value of 10 degrees to 60 degrees with respect to the equator plane of the tire. Therefore, a portion provided along the tread surface of the carcass ply can be reinforced sufficiently, and at the same time, the stiffness of the tread portion of the tire for a motorcycle can be prevented from being excessively increased.

In addition, the width of the band ply is set to be 20% to 65% of the width of the tread and the fold-back portion overlaps with the band ply in 15 mm or less. Therefore, a region provided from the tread portion to the shoulder portion is excellent in a structural continuity. In other words, the stiffness of the region provided from the tread portion to the shoulder portion is smoothly changed. In addition, an increase in the weight of the tire for a motorcycle can be suppressed.

It is preferable that the band cord should be formed of an organic fiber or a metal. In the case in which the band cord is constituted by the metal, the carcass ply can be reinforced strongly. In the case in which the band cord is constituted by the organic fiber, an increase in the weight of the tire for a motorcycle can further be suppressed.

It is preferable that another member should be provided in a region surrounded by the belt ply and the band ply. A modulus of elasticity of the member is smaller than that of a material constituting the tread surface. In the tire, a cushion is provided in the region surrounded by the belt ply and the band ply. Accordingly, shock applied to the tread portion is effectively relieved. As a result, the motorcycle can have the advantage that straight running stability and ride comfort can be enhanced.

BRIEF DESCRIPTION OF THE DRAWINGS

The present invention will now be described below in detail based on the preferred embodiments of the present invention with reference to the following drawings, wherein.

DESCRIPTION OF THE PREFERRED EMBODIMENTS

A. Schematic Structure and Feature of Tire

Figure 1:
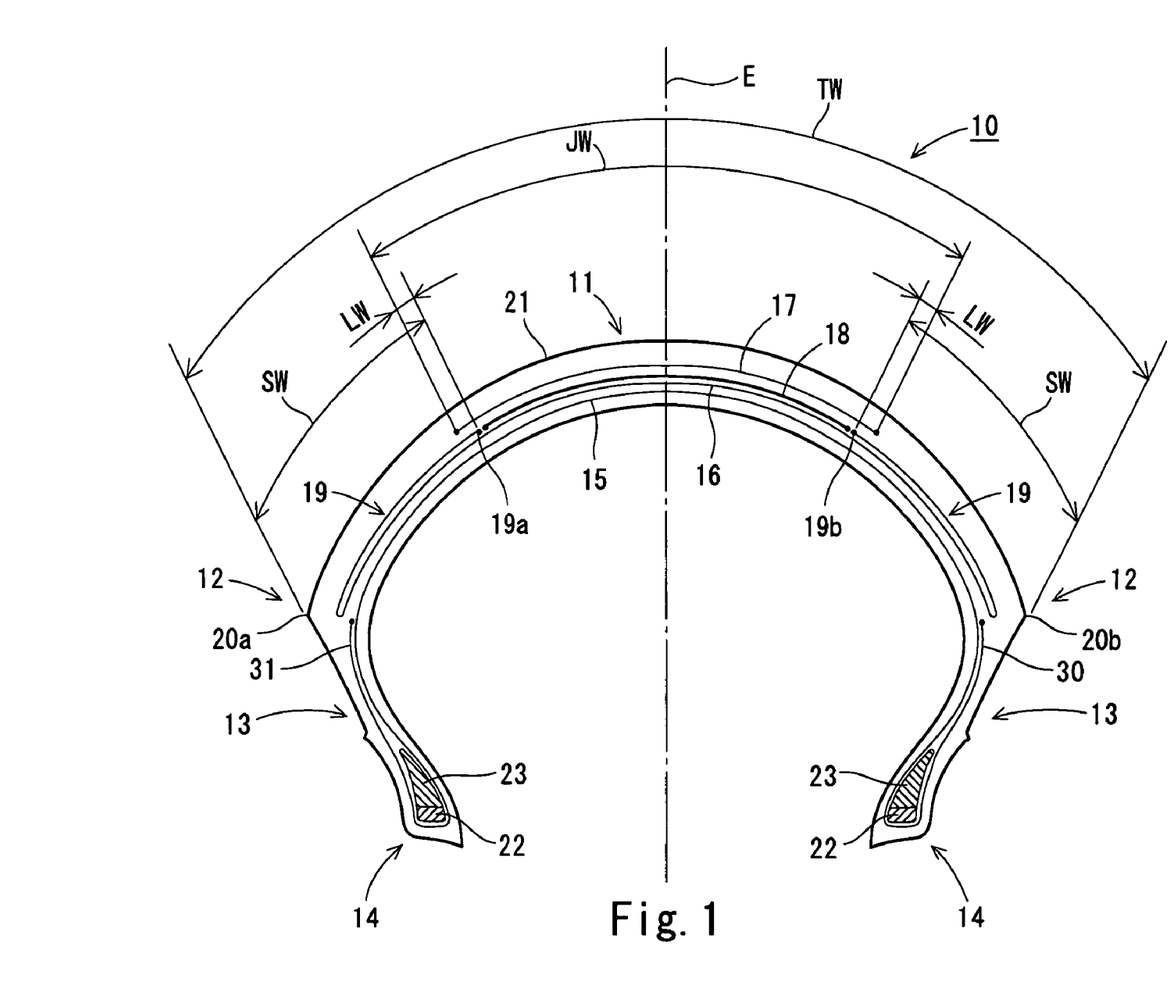
FIG. 1 is a sectional view showing a main part in a structure of a tire for a motorcycle according to an embodiment of the present invention.

FIG. 1 shows a section taken along a plane which passes through the center of a tire 10 and is orthogonal to an equator plane E of the tire 10. In FIG. 1, the vertical direction is set to be the radial direction of the tire 10, and the transverse direction is set to be the axial direction of the tire 10.

The tire 10 takes an almost symmetrical shape about the equator plane E excluding the tread pattern. The tire 10 has a tread portion 11, a pair of shoulder portions 12 linked to both sides of the tread portion 11 (both sides in the axial direction of the tire 10), and furthermore, a pair of sidewall portions 13 and a pair of bead portions 14 which are linked thereto, a carcass portion 15, a belt portion 16, a band portion 17, and a buffer portion 18 provided in a region partitioned by the band portion 17 and the belt portion 16.

In the tire 10, the tread portion 11, the shoulder portion 12, the sidewall portion 13, the bead portion 14, the carcass portion 15, the belt portion 16, the band portion 17 and the buffer portion 18 are constituted integrally, and the carcass portion 15, the belt portion 16, the band portion 17 and the buffer portion 18 are present as a carcass ply, a belt ply, a band ply and a buffer layer which are formed in the tire 10, respectively. The carcass portion 15, the belt portion 16, the band portion 17 and the buffer portion 18 will be hereinafter referred to as a carcass ply 15, a belt ply 16, a band ply 17 and a buffer ply 18, respectively.

As shown in FIG. 1, the present embodiment is characterized in that (1) both ends of the belt ply 16 are folded back so that a fold-back portion 19 is formed, (2) the band ply 17 is formed on the outside of the belt ply 16, (3) the buffer layer 18 is formed in the region surrounded by the belt ply 16 and the band ply 17, and (4) the width JW of the belt ply 16, the dimension SW of the inner end of the fold-back portion 19 and the dimension LW of the overlap of the belt ply 16 and the fold-back portion 19 have a relationship with the tread width TW.

B. Structure of Each Portion of Tire

In the present embodiment, the tread width TW indicates the distance between the outer ends of the shoulder portions 12, that is, the distance between edgemost portions 20a and 20b in the axial direction of the shoulder portion 12, which is measured along a tread surface 21 (a geodetic line) of the tread portion 11. The width JW of the band ply 17 indicates the distance in the axial direction of the band ply 17 which is measured along the tread surface 21 (the geodetic line of the tread surface). The dimension SW of the inner end of the fold-back portion 19 indicates distances between an end 19a of the fold-back portion 19 and the edgemost portion 20a and between an end 19b of the fold-back portion 19 and the edgemost portion 20b which are measured along the tread surface 21. The dimension LW of the overlap indicates the lengths of the overlap portions of both ends of the band ply 17 and the fold-back portions 19 which are measured along the tread surface 21 (the geodetic line of the tread surface). The width JW of the belt ply 16, the dimension SW of the inner end of the fold-back portion 19, the dimension LW of the overlap of the belt ply 16 and the fold-back portion 19, and the tread width TW are all measured in a state in which the tire 10 is cut away along a virtual cutting plane in a radial direction.

The tread portion 11 is formed of a crosslinked rubber, and the tread surface 21 is formed like an arch to be outwardly convex in the radial direction. When a motorcycle is to carry out cornering, the driver tilts the motorcycle inward in a cornering direction. At this time, the tire 10 comes in contact with the road surface to form a camber angle. A camber thrust is generated on the contact surface of the tire in order to resist a centrifugal force generated during the cornering of the motorcycle. By this force, the motorcycle stably carries out the cornering. In order to generate a stable camber thrust, thus, the tread surface 21 is formed to draw a large arch as shown in FIG. 1.

The tread surface 21 comes in contact with the road surface. For this reason, a tread pattern (not shown) constituted by a groove portion and a land portion is formed on the tread surface 21. In the present embodiment, the tread portion 11 is constituted by a styrene-butadiene rubber (SBR). This material has a modulus of elasticity of 5.2 MPa. Various other rubbers can be employed for the material constituting the tread portion 11 (that is, the tread surface 21).

The sidewall portion 13 is linked to the tread portion 11 and is extended inward in the radial direction from both ends of the tread portion 11. More specifically, the sidewall portion 13 is bent inward in the radial direction from the tread portion 11, and the shoulder portion 12 is constituted by a portion for connecting both of them. In the present embodiment, as shown in FIG. 1, the shoulder portion 12 is formed in such a manner that the edgemost portions 20a and 20b protrude in an axial direction. The shoulder portion 12 and the sidewall portion 13 are also formed of a crosslinked rubber. The sidewall portion 13 absorbs the shock from the road surface by flexure. Moreover, the sidewall portion 13 protects the carcass ply 15, thereby preventing damage. By constituting the shoulder portion 12, furthermore, it is possible to enhance the stiffness of the tire 10 (particularly, the lateral stiffness).

The bead portion 14 is linked to the sidewall portion 13. The bead portion 14 includes a bead core 22 and a bead apex 23 extending outward in the radial direction from the bead core 22. The bead core 22 is ring-shaped and includes a plurality of non-extensible wires (typically, wires formed of steel). The bead apex 23 is outward tapered in the radial direction and is formed by a crosslinked rubber.

C. Layer Structure of Tire

As shown in FIG. 1, the carcass ply 15 is formed along the tread portion 11, and furthermore, is extended along the shoulder portion 12, the sidewall portion 13 and the bead portion 14. Both ends 30 and 31 of the carcass ply 15 are laid from inside toward the outside in the axial direction of the bead core 22, and furthermore, are wound up by a predetermined length along the sidewall portion 13. Thus, the carcass ply 15 is laid around the bead core 22. Consequently, the stiffness of the sidewall 13 can be enhanced.

The belt ply 16 is provided along the tread portion 11 and is disposed on the outside of the carcass ply 15 in the radial direction. The belt ply 16 fastens the carcass ply 15 in the radial direction and reinforces the carcass ply 15. As shown in FIG. 1 the belt ply 16 is formed in almost the whole region of the tread portion 11 to reliably reinforce the carcass ply 15. Both ends of the belt ply 16 are extended to the shoulder portion 12 and are formed in a fold-back state as shown in FIG. 1. More specifically, the both ends of the belt ply 16 are reversed outward in the radial direction and are formed to overlap with the belt ply 16, respectively. The fold-back portion 19 is constituted by the overlap portion. The dimension SW of the inner end of the fold-back portion 19 is set to be 24.1% of the tread width TW in the present embodiment. The dimension SW of the inner end can be properly set within a range of 20% to 40% of the tread width TW.

The band ply 17 is provided along the tread portion 11 and is disposed on the outside of the belt ply 16 in the radial direction. The band ply 17 fastens and reinforces the carcass ply 15 in the radial direction in cooperation with the belt ply 16. The belt ply 16 is formed in the central part of the tread portion 11 as shown in FIG. 1. The width JW of the band ply 17 is set to be 48% of the tread width TW in the present embodiment. The width JW can be properly set within a range of 20% to 65% of the tread width TW.

The band ply 17 and the belt ply 16 are formed as described above so that the fold-back portion 19 of the belt ply 16 and the band ply 17 overlap with each other. In the present embodiment, the overlap dimension LW is set to be 7 mm. The overlap dimension LW can be set to be equal to or smaller than 15 mm.

The carcass ply 15, the belt ply 16 and the band ply 17 may include a plurality of layers. When the carcass ply 15, the belt ply 16 and the band ply 17 are formed to have a single layer as in the present embodiment, the tire 10 can easily be manufactured, and furthermore, the weight of the tire 10 can be reduced. When the band ply 17 positioned in an outermost part is formed to have a single layer, particularly, there is an advantage that a moment of inertia can be reduced in addition to a decrease in the weight of the tire 10.

The buffer layer 18 is formed in the region surrounded by the belt ply 16 and the band ply 17. More specifically, the buffer layer 18 is formed between the belt ply 16 and the band ply 17 and is filled in a region in which the belt ply 16 and the band ply 17 overlap with each other. In the present embodiment, the buffer layer 18 is constituted by a rubber. The rubber constituting the buffer layer 18 has a modulus of elasticity of 4.0 MPa, and the thickness of the buffer layer 18 is set to be 1.0 mm. The modulus of elasticity of the material of the buffer layer 18 is smaller than that of the material of the tread portion 11. The thickness of the buffer layer 18 is almost equal to that of the belt ply 16 and can be properly set to be 0.7 mm to 1.3 mm.

Figure 2:
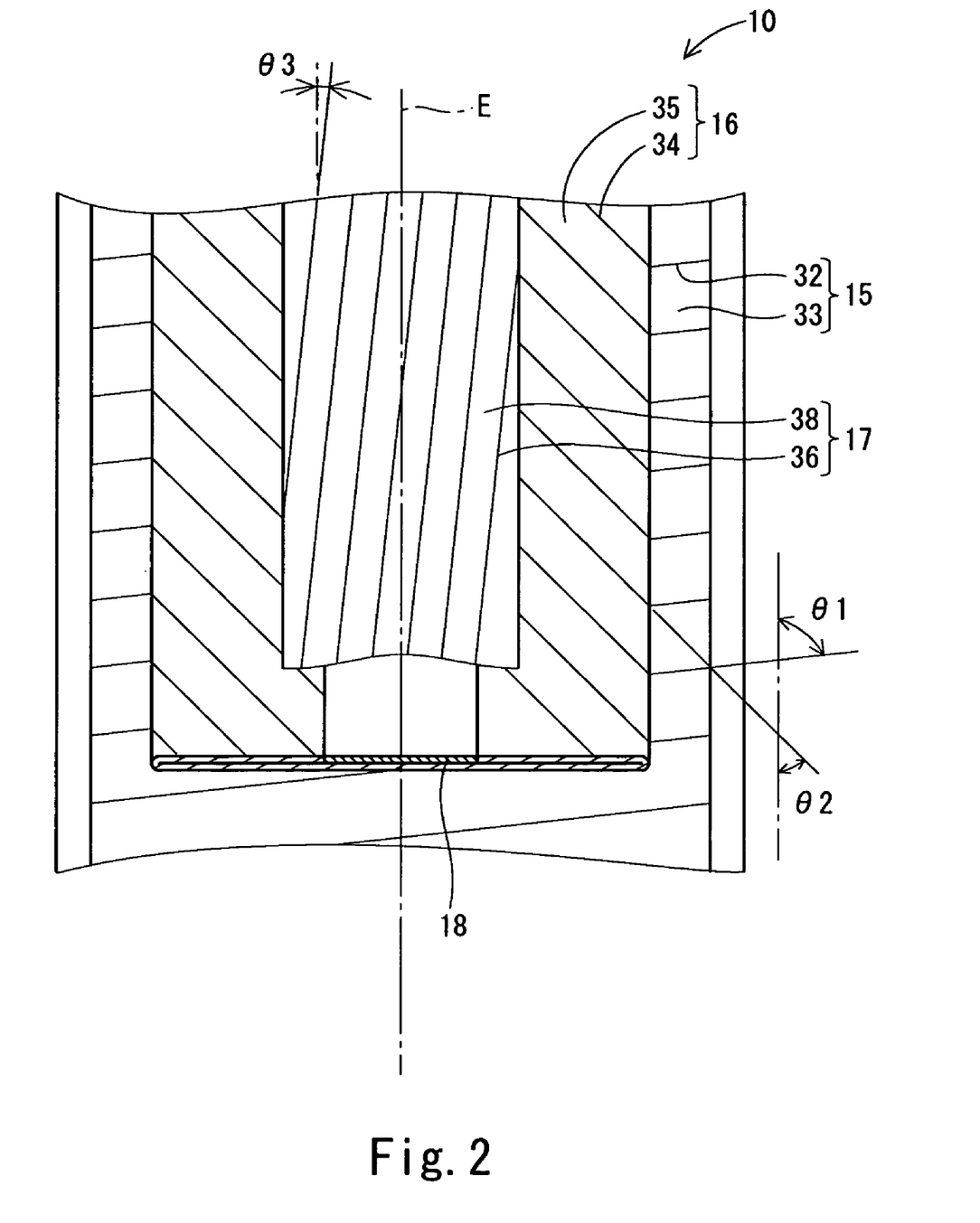
FIG. 2 is a plan view showing the main part of the tire in FIG. 1.

In the case in which the buffer layer 18 is constituted by a plurality of members, it is preferable that the modulus of elasticity of the whole buffer layer 18 should be set to be smaller than that of the material constituting the tread portion FIG. 2 is a plan view showing the main part of the tire 10, illustrating a section taken away through a virtual plane along the tread portion 11. As shown in FIG. 2, the belt ply 16 and the band ply 17 are sequentially provided on the outside of the carcass ply 15 in the radial direction and the outside of the belt ply 16 in the radial direction, respectively.

The carcass ply 15 includes a plurality of carcass cords 32. The carcass cords 32 are previously covered with a topping rubber sheet 33 and are thus arranged. The topping rubber sheet 33 is fused to another portion when the tire 10 is to be formed. The carcass cord 32 is provided to cross the equator plane E (in the circumferential direction of the tire 10) at an angle $\theta_1$. $\theta_1$ can be properly set to be 65 to 90 degrees. In the present embodiment, $\theta_1$ is set to be 90 degrees. It is preferable that the angle $\theta_1$ should be set to be 65 to 90 degrees as an absolute value, and the angle $\theta_1$ can also be set to be −65 to −90 degrees with respect to the equator plane E. In the present embodiment, the carcass cord 32 is constituted by a nylon fiber. The carcass cord 32 may be constituted by a rayon fiber, an aromatic polyamide fiber or other organic fibers.

The belt ply 16 includes a plurality of belt cords 34 in the same manner as the carcass ply 15. The belt cords 34 are previously covered with a topping rubber sheet 35 and are thus arranged. The topping rubber sheet 35 is fused to another portion when the tire 10 is to be formed. The belt cord 34 is provided to cross the equator plane E at an angle $\theta_2$. $\theta_2$ can be properly set to be −10 to −60 degrees. In the present embodiment, $\theta_2$ is set to be −45 degrees. The direction of the belt cord 34 crosses that of the carcass cord 32. It is preferable that the angle $\theta_2$ should be set to be 10 to 60 degrees as an absolute value, and the angle $\theta_2$ can also be set to be 10 to 60 degrees with respect to the equator plane E. In the present embodiment, the belt cord 34 is constituted by an aromatic polyamide fiber (that is, an aramid fiber). The belt cord 34 may be constituted by a nylon fiber, a rayon fiber or other organic fibers. A metal such as steel may be employed for the belt cord 34.

The band ply 17 includes a band cord 36. The band cord 36 is a single long member and is wound in almost the circumferential direction. The belt ply 16 and the carcass ply 15 are fastened and reinforced by the band cord 36.

Figure 3:
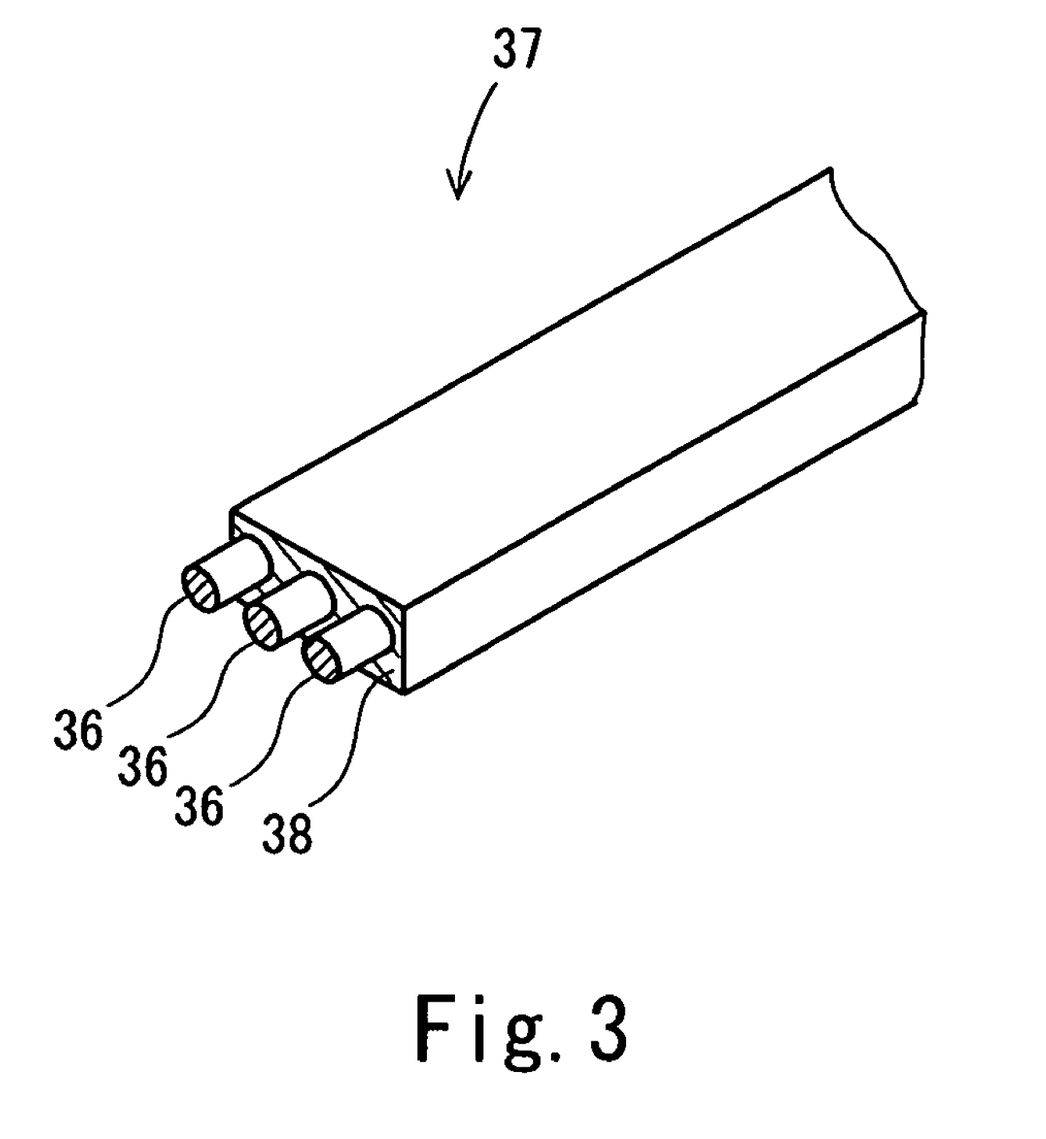
FIG. 3 is an enlarged perspective view showing the main part of a band-shaped sheet to be employed for the band ply of the tire in FIG. 2.

The band ply 17 is constituted by a slender band-shaped sheet. FIG. 3 is an enlarged perspective view showing the main part of the band-shaped sheet. As shown in FIG. 3, a band-shaped sheet 37 is constituted by covering three band cords 36 with a topping rubber sheet 38. The number of the band cords 36 is not restricted to three but can be properly designed and changed. The band-shaped sheet 37 is wound upon the outside of the belt ply 16 in the radial direction in almost the circumferential direction. The band-shaped sheet 37 is wound spirally at an angle of 10 degrees or less, and preferably an angle of 5 degrees or less with respect to the circumferential direction.

Since the band-shaped sheet 37 is wound at the above-mentioned angle with respect to the circumferential direction, the band cord 36 is provided at an angle of 10 degrees or less with respect to the equator plane E. It is sufficient that this angle has an absolute value of 10 degrees or less. The band cord 36 may be provided at an angle of −10 degrees or more with respect to the equator plane E. The topping rubber sheet 38 is bonded to other portions when the tire 10 is to be formed. The band cord 36 is constituted by an aromatic polyamide fiber. The band cord 36 may be constituted by an organic fiber such as a nylon fiber or a rayon fiber. A metal such as steel may be employed for the band cord 36.

D. Function and Effect of Tire according to the Present Embodiment

According to the tire 10 in accordance with the present embodiment, the carcass ply 15 is formed along the tread portion 11, the shoulder portion 12 and the sidewall portion 13, and furthermore, is wound upon the bead core 22 and is then formed along the sidewall portion 13 again. The side wall portion 13 of the tire 10 has a high stiffness. The carcass ply 15 is reinforced by the belt ply 16, and furthermore, the band ply 17.

Since the belt ply 16 is formed along the tread portion 11, it reinforces the carcass ply 15, and furthermore, the shoulder portion 12. In the present embodiment, particularly, the both ends of the belt ply 16 are extended to the shoulder portion 12. Therefore, the sufficient stiffness of the shoulder portion 12 can be maintained. In addition, the both side portions of the belt ply 16 constitute the fold-back portion 19. Consequently, the stiffness of the shoulder portion 12 can be enhanced particularly effectively. On the other hand, the dimension of the inner end of the fold-back portion 19 is set to be 20% to 40% of the tread width TW. Therefore, it is possible to intensively enhance only the stiffness of the shoulder portion 12 while suppressing an increase in the weight of the tire 10.

Moreover, the dimension of the inner end of the fold-back portion 19 is set to be 20% to 40% of the tread width TW. Consequently, a single layer reinforces the carcass ply 15 in the central part of the tread portion 11 of the tire 10. In this region, the carcass ply 15 is reinforced by only the band ply 17. Accordingly, the stiffness of the tread portion 11 can be prevented from being excessively increased. In addition, the direction of the carcass cord 32 is set to be 65 to 90 degrees with respect to the equator plane E, and furthermore, the direction of the belt cord 34 is set to be −10 to −60 degrees with respect to the equator plane E. Therefore, the portion of the carcass ply 15 which is provided along the tread surface 21 can be sufficiently reinforced and the stiffness of the tread portion 11 can be prevented from being excessively increased.

In the tire 10 according to the present embodiment, the stiffness of the shoulder portion 12 can be enhanced intensively. In the case in which the motorcycle carries out high speed cornering, the stiffness in the contact surface portion of the tire 10 is high so that a great traction is generated in the contact surface portion. Accordingly, the tire 10 can enhance the high speed cornering property of the motorcycle.

Moreover, the stiffness of the central part of the tread portion 11 in the tire 10 is reduced. In the case in which the motorcycle carries out high speed straight running, therefore, tire lifting is suppressed in the portion where the tire 10 comes in contact (the central part of the tread portion 11). As described above, furthermore, the dimension of the inner end of the fold-back portion 19 is set to be 20% to 40% of the tread width TW. In the central part of the tread portion 11 in the tire 10, consequently, the carcass ply 15 is reinforced by only the band ply 17. Therefore, a small cornering force is generated in the central part of the tread portion 11. Thus the tire 10 enhances the high speed straight running stability of the motorcycle.

The width JW of the band ply 17 is set to be 20% to 65% of the tread width TW and the fold-back portion 19 of the belt ply 16 overlaps with the band ply 17 in a length of 15 mm or less. Consequently, a region provided from the tread portion 11 to the shoulder portion 12 is continuously provided smoothly on a structural basis. In the region provided from the tread portion 11 to the shoulder portion 12, the thicknesses of the reinforcing layers (the belt ply 16 and the band ply 17) for reinforcing the carcass ply 15 can be almost equal to each other and the stiffness of the same region is changed smoothly. The tire 10 is excellent in a structural continuity. In the case in which the motorcycle makes a transition from the straight running to the cornering or from the cornering to the straight running, the linearity of a running state is maintained. Consequently, handling can be carried out smoothly.

In the tire 10 according to the present embodiment, particularly, the band cord 36 is constituted by a metal. Therefore, the carcass ply 15 can be reinforced strongly so that the tire 10 can take a countermeasure against an increase in the weight and speed of the motorcycle. In the case in which the band cord 36 is constituted by an organic fiber, there is an advantage that the stiffness of the tire 10 can be prevented from being excessively increased and an increase in the weight of the tire 10 can be suppressed.

In the tire 10 according to the present embodiment, the buffer layer 18 is formed between the belt ply 16 and the band ply 17. Therefore, a cushion is maintained to be provided in the region surrounded by the belt ply 16 and the band ply 17. Accordingly, a shock to be applied to the tread portion 11 can be relieved effectively. As a result, there is an advantage that a transition characteristic between the straight running and the cornering of the motorcycle can further be enhanced and a ride comfort can be improved. The buffer layer 18 may be omitted. Also in that case, the high speed straight running stability and the cornering property of the motorcycle are not influenced.

EXAMPLES

Tables 1 to 3 show a result obtained by carrying out the evaluation of the performance of a tire according to each of examples and comparative examples (a high speed straight running stability, a cornering property, and a transition characteristic). A used vehicle is a motorcycle for on-road use which comprises a 4-cycle engine having a displacement of 750 cc. The tire has a size of 120/70ZR17 on a front side and 180/55ZR17 on a rear side. A tread width TW is 228 mm and a width of a belt ply is 206 mm. The tire is attached to a rim having the following size at the following internal pressure.

Front tire: MT17×3.50–250 kPa

Rear tire: MT17×5.50–290 kPa

A running test was carried out over a dry pavement.

The tire on the front side was set to be constant and the details of the tires on the rear side were changed in the following manner, and a comparison test was thus carried out, by the subjective evaluation of a test rider, for a high speed straight running stability, a cornering property and a transition characteristic in the case in which a test vehicle ran. The transition characteristic implies the handling condition for the transition period from the straight running to the cornering and the handling condition for the transition period from the cornering to the straight running. The subjective evaluation of the test rider is expressed in relative evaluation (grade) on the basis of five points.

The details of the tire according to each of the examples and the comparative examples are as follows.

Example 1

The number of carcass plies is one. A carcass cord is constituted by a nylon fiber of 2/1440 dtex. The direction of the carcass cord with respect to an equator plane is 90 degrees. The number of belt plies is one. A belt cord is constituted by an aromatic polyamide fiber (an aramid fiber) of 2/1670 dtex. The direction of the belt cord with respect to the equator plane is −45 degrees. A dimension SW of the inner end of the belt ply is 24.1% of a tread width TW. The number of band plies is one. A width JW of the band ply is 48% of the tread width TW. A band cord is constituted by aromatic polyamide of 2/1670 dtex. A dimension LW of the overlap of the band ply and the belt ply is 7 mm. A buffer layer is not present between the belt ply and the band ply.

Example 2

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 35.1% of a tread width TW. The number of band plies is one. A width JW of the band ply is 26% of the tread width TW. A band cord is constituted by an aromatic polyamide fiber of 2/1670 dtex. A dimension LW of the overlap of the band ply and the belt ply is 7 mm. A buffer layer is not present between the belt ply and the band ply.

Example 3

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 30.7% of a tread width TW. The number of band plies is one. A width JW of the band ply is 35% of the tread width TW. A band cord is constituted by an aromatic polyamide fiber of 2/1670 dtex. A dimension LW of the overlap of the band ply and the belt ply is 7 mm. A buffer layer is not present between the belt ply and the band ply.

Example 4

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 24.1% of a tread width TW. The number of band plies is one. A width JW of the band ply is 53% of the tread width TW. A band cord is constituted by an aromatic polyamide fiber of 2/1670 dtex. A dimension LW of the overlap of the band ply and the belt ply is 12 mm. A buffer layer is not present between the belt ply and the band ply.

Example 5

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 30.7% of a tread width TW. The number of band plies is one. A width JW of the band ply is 35% of the tread width TW. A band cord is constituted by an aromatic polyamide fiber of 2/1670 dtex. A dimension LW of the overlap of the band ply and the belt ply is 7 mm. A buffer layer is formed between the belt ply and the band ply.

Comparative Example 1

The number of carcass plies is one. A carcass cord is constituted by a nylon fiber of 2/1440 dtex. The direction of the carcass cord is 90 degrees. The number of belt plies is two. A belt cord is constituted by an aromatic polyamide fiber of 2/1670 dtex. The direction of the belt cord is −20 degrees. The belt ply does not have a fold-back portion. A band ply is not present and a buffer layer is not present.

Comparative Example 2

The number of carcass plies is one. A carcass cord is constituted by a nylon fiber of 2/1440 dtex. The direction of the carcass cord is 90 degrees. A belt ply is not present. The number of band plies is one. A width JW of the band ply is 90% of a tread width TW. A band cord is constituted by an aromatic polyamide fiber of 2/1670 dtex. A buffer layer is not present.

Comparative Example 3

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −72 degrees. The belt ply does not have a fold-back portion. The number of band plies is one. A width JW of the band ply is 90% of a tread width TW. A band cord is constituted by an aromatic polyamide fiber of 2/1670 dtex. A dimension LW of the overlap of the band ply and the belt ply is 0 mm. A buffer layer is not present between the belt ply and the band ply.

Comparative Example 4

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 24.1% of a tread width TW. The number of band plies is one. A width JW of the band ply is 90% of the tread width TW. A band cord is constituted by an aromatic polyamide fiber of 2/1670 dtex. A dimension LW of the overlap of the band ply and the belt ply is 55 mm. A buffer layer is not present between the belt ply and the band ply.

Comparative Example 5

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 24.1% of a tread width TW. A reinforcing layer is further formed between the belt ply and a band ply. The number of the band plies is one. A width JW of the band ply is 48% of the tread width TW. A band cord is constituted by an aromatic polyamide fiber of 2/1670 dtex. A dimension LW of the overlap of the band ply and the belt ply is 7 mm. A buffer layer is not present between the belt ply and the band ply.

Comparative Example 6

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 24.1% of a tread width TW. The number of the band plies is one. A width JW of the band ply is 61% of the tread width TW. A band cord is constituted by an aromatic polyamide fiber of 2/1670 dtex. A dimension LW of the overlap of the band ply and the belt ply is 22 mm. A buffer layer is not present between the belt ply and the band ply.

Comparative Example 7

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 43.9% of a tread width TW. The number of the band plies is one. A width JW of the band ply is 18% of the tread width TW. A band cord is constituted by an aromatic polyamide fiber of 2/1670 dtex. A dimension LW of the overlap of the band ply and the belt ply is 17 mm. A buffer layer is not present between the belt ply and the band ply.

Comparative Example 8

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. Moreover, a dimension SW of the inner end of the belt ply is 13.2% of a tread width TW. The number of the band plies is one. A width JW of the band ply is 70% of the tread width TW. A band cord is constituted by an aromatic polyamide fiber of 2/1670 dtex. A dimension LW of the overlap of the band ply and the belt ply is 7 mm. A buffer layer is not present between the belt ply and the band ply.

Comparative Example 9

The number of carcass plies is one. A carcass cord is constituted by a nylon fiber of 2/1440 dtex. The direction of the carcass cord is 90 degrees. The number of belt plies is one. A belt cord is constituted by an aromatic polyamide fiber of 2/1670 dtex. The direction of the belt cord is −45 degrees. A dimension SW of the inner end of the belt ply is 24.1% of a tread width TW. The number of the band plies is one. A width JW of the band ply is 57% of the tread width TW. A band cord is constituted by an aromatic polyamide fiber of 2/1670 dtex. A dimension LW of the overlap of the band ply and the belt ply is 17 mm. A buffer layer is not present between the belt ply and the band ply.

TABLE 1

| | | Comp. example 1 | Comp. example 2 | Comp. example 3 | Comp. example 4 | Comp. example 5 |
|---|---|---|---|---|---|---|
| Car-cass | Material of cord | Nylon | Nylon | Nylon | Nylon | Nylon |
| | Fineness of cord (dtex) | 2/1440 | 2/1440 | 2/1440 | 2/1440 | 2/1440 |
| | Direction of cord (degree) | 90 | 90 | 90 | 90 | 90 |
| | Number of sheets | 1 | 1 | 1 | 1 | 1 |
| Belt | Material of cord | Aramid | — | Aramid | Aramid | Aramid |
| | Fineness of cord (dtex) | 2/1670 | — | 2/1670 | 2/1670 | 2/1670 |
| | Direction of cord (degree) | −20 | — | −72 | −45 | −45 |
| | Number of sheets | 2 | — | 1 | 1 | 1 |
| | Dimension of inner end SW (%) | — | — | — | 24.1 | 24.1 |
| | | — | — | — | — | +1 cut |
| Band | Material of cord | — | Aramid | Aramid | Aramid | Aramid |
| | Fineness of cord (dtex) | — | 2/1670 | 2/1670 | 2/1670 | 2/1670 |
| | Number of sheets | — | 1 | 1 | 1 | 1 |
| | Width JW | — | 90 | 90 | 90 | 48 |
| Length of tread TW (mm) | | 228 | 228 | 228 | 228 | 228 |
| Width of belt ply (mm) | | 206 | — | 206 | 206 | 206 |
| Dimension of overlap LW (mm) | | — | — | — | 55 | 7 |
| Buffer Layer | | No | No | No | No | No |
| High speed running stability | | 3.0 | 4.0 | 4.5 | 3.8 | 3.0 |
| Cornering property | | 4.5 | 3.5 | 3.8 | 4.5 | 4.5 |
| Transition characteristic | | 4.0 | 4.0 | 4.0 | 3.5 | 3.0 |

TABLE 2

| | | Comp. example 6 | Comp. example 7 | Comp. example 8 | Comp. example 9 |
|---|---|---|---|---|---|
| Carcass | Material of cord | Nylon | Nylon | Nylon | Nylon |
| | Fineness of cord (dtex) | 2/1440 | 2/1440 | 2/1440 | 2/1440 |
| | Direction of cord (degree) | 90 | 90 | 90 | 90 |
| | Number of sheets | 1 | 1 | 1 | 1 |
| Belt | Material of cord | Aramid | Aramid | Aramid | Aramid |
| | Fineness of cord (dtex) | 2/1670 | 2/1670 | 2/1670 | 2/1670 |
| | Direction of cord (degree) | −45 | −45 | −45 | −45 |
| | Number of sheets | 1 | 1 | 1 | 1 |
| | Dimension of inner end SW (%) | 24.1 | 43.9 | 13.2 | 24.1 |
| | | — | — | — | — |
| Band | Material of cord | Aramid | Aramid | Aramid | Aramid |
| | Fineness of cord (dtex) | 2/1670 | 2/1670 | 2/1670 | 2/1670 |
| | Number of sheets | 1 | 1 | 1 | 1 |
| | Width JW | 61 | 18 | 70 | 57 |
| Length of tread TW (mm) | | 228 | 228 | 228 | 228 |
| Width of belt ply (mm) | | 206 | 206 | 206 | 206 |
| Dimension of overlap LW (mm) | | 22 | 17 | 7 | 17 |
| Buffer Layer | | No | No | No | No |
| High speed running stability | | 4.5 | 3.5 | 3.8 | 4.5 |
| Cornering property | | 4.2 | 4.5 | 3.5 | 4.2 |
| Transition characteristic | | 3.5 | 3.5 | 3.8 | 3.5 |

TABLE 3

| | | Example 1 | Example 2 | Example 3 | Example 4 | Example 5 |
|---|---|---|---|---|---|---|
| Carcass | Material of cord | Nylon | Nylon | Nylon | Nylon | Nylon |
| | Fineness of cord (dtex) | 2/1440 | 2/1440 | 2/1440 | 2/1440 | 2/1440 |
| | Direction of cord (degree) | 90 | 90 | 90 | 90 | 90 |
| | Number of sheets | 1 | 1 | 1 | 1 | 1 |
| Belt | Material of cord | Aramid | Aramid | Aramid | Aramid | Aramid |
| | Fineness of cord (dtex) | 2/1670 | 2/1670 | 2/1670 | 2/1670 | 2/1670 |
| | Direction of cord (degree) | −45 | −45 | −45 | −45 | −45 |
| | Number of sheets | 1 | 1 | 1 | 1 | 1 |
| | Dimension of inner end SW (%) | 24.1 | 35.1 | 30.7 | 24.1 | 30.7 |
| | | — | — | — | — | — |
| Band | Material of cord | Aramid | Aramid | Aramid | Aramid | Aramid |
| | Fineness of cord (dtex) | 2/1670 | 2/1670 | 2/1670 | 2/1670 | 2/1670 |
| | Number of sheets | 1 | 1 | 1 | 1 | 1 |
| | Width JW | 48 | 26 | 35 | 53 | 35 |
| Length of tread TW (mm) | | 228 | 228 | 228 | 228 | 228 |
| Width of belt ply (mm) | | 206 | 206 | 206 | 206 | 206 |
| Dimension of overlap LW (mm) | | 7 | 7 | 7 | 12 | 7 |
| Buffer Layer | | No | No | No | No | Exist |
| High speed running stability | | 4.5 | 4.2 | 4.5 | 4.5 | 4.5 |
| Cornering property | | 4.2 | 4.5 | 4.5 | 4.2 | 4.5 |
| Transition characteristic | | 4.0 | 4.0 | 4.5 | 4.0 | 4.8 |

As shown in the Tables 1 to 3, the result of evaluation in each of the examples is more advantageous than that in each of the comparative examples. More specifically, the tire in which the dimension SW of the inner end of the fold-back portion of the belt ply is limited to a range of 20% to 40% of the tread width TW and the width JW of the band ply is limited to a range of 20% to 65% of the tread width TW, and furthermore, the dimension LW of the overlap of the fold-back portion of the belt ply and the band portion is equal to or smaller than 15 mm is excellent in a high speed straight running stability and a cornering property. In addition, in the case in which the buffer layer is provided as shown in the example 5, a transition state is further stabilized.

As described above, in the tire according to the present invention, an enhancement in the stiffness of the tread portion is suppressed and only the stiffness of the sidewall portion is enhanced. Therefore, the motorcycle can be implemented with a straight running stability and a high speed cornering property on a high level.

In addition, the region provided from the tread portion to the sidewall portion is excellent in a structural continuity. Therefore, a transition state from the straight running to the cornering or from the cornering to the straight running can realize an excellent linearity. As a result, also in the case in which the high speed straight running and the high speed cornering are repeated, stable running can be implemented.

The above description is only illustrative and various changes can be made without departing from the scope of the present invention.

What is claimed is:

1. A tire for a motorcycle comprising:
   a carcass ply formed in a winding state from an inside toward an outside in an axial direction of the tire around a pair of bead cores opposed to each other in the axial direction of the tire and provided along a tread;
   a belt ply and a band ply formed along the tread and laminated, in order, on an outside of the carcass ply in a radial direction of the tire; and
   a member having a modulus of elasticity which is smaller than that of a material constituting the tread surface provided in a region surrounded by the belt ply and the band ply,
   wherein the carcass ply has a carcass cord constituted by an organic fiber provided to cross an equator plane of the tire at an angle of 65 to 90 degrees as an absolute value,
   the belt ply has a belt cord which crosses the equator plane of the tire at an angle of 10 to 60 degrees as an absolute value,
   both side portions of the belt ply in the axial direction of the tire are folded back outward in the radial direction of the tire to form a pair of fold-back portions,
   the band ply has a band cord wound spirally to cross the equator plane of the tire at an angle of 10 degrees or less as an absolute value,
   the dimension of the inner end of each of the fold-back portions is set to be 20% to 40% of a tread width,
   a width of the band ply is set to be 20% to 65% of the tread width,
   the dimension of overlap of each of the fold-back portions and the band ply is set to be equal to or smaller than 15 mm, and
   the member is a buffer layer which extends between the opposing overlapping ends of the belt ply and has a thickness of 0.7 mm to 1.3 mm.

2. The tire for a motorcycle according to claim 1, wherein the band cord is formed of an organic fiber or a metal.

3. The tire of claim 1, wherein the buffer layer has a modulus of elasticity of 4.0 MPa.

* * * * *